(12) United States Patent
Huang et al.

(10) Patent No.: US 12,241,874 B2
(45) Date of Patent: Mar. 4, 2025

(54) ELECTRO-MAGNETO-THERMO-MECHANICAL DYNAMIC AND SYNCHRONOUS LOADING DEVICE BASED ON WEDGE-SHAPED ROTATING BODY

(71) Applicant: Hefei Institutes of Physical Science, Chinese Academy of Sciences, Hefei (CN)

(72) Inventors: Liansheng Huang, Hefei (CN); Shiying He, Hefei (CN); Xiaojiao Chen, Hefei (CN); Xiuqing Zhang, Hefei (CN); Chuan Li, Hefei (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 331 days.

(21) Appl. No.: 18/057,385

(22) Filed: Nov. 21, 2022

(65) Prior Publication Data
US 2023/0175938 A1 Jun. 8, 2023

(30) Foreign Application Priority Data
Nov. 22, 2021 (CN) .......................... 202111389467.6

(51) Int. Cl.
*G01N 3/16* (2006.01)

(52) U.S. Cl.
CPC ..... *G01N 3/165* (2013.01); *G01N 2203/0003* (2013.01); *G01N 2203/0028* (2013.01); *G01N 2203/005* (2013.01)

(58) Field of Classification Search
CPC ........... G01N 3/165; G01N 2203/0003; G01N 2203/0028; G01N 2203/005
See application file for complete search history.

(56) References Cited

U.S. PATENT DOCUMENTS 5,195,378 A * 3/1993 Ferguson ................. G01N 3/10
73/790
2020/0116660 A1* 4/2020 Pettit ....................... G01N 25/12

OTHER PUBLICATIONS

UK search report for GB2614606, accessed from ipo.gov.uk Dec. 9, 2024.*
UK search report for GB2614607, accessed from ipo.gov.uk Dec. 9, 2024.*

* cited by examiner

*Primary Examiner* — Kristina M Deherrera
*Assistant Examiner* — Jean F Morello
(74) *Attorney, Agent, or Firm* — DLA PIPER LLP (US)

(57) ABSTRACT

Disclosed is an electro-magneto-thermo-mechanical dynamic and synchronous loading device based on a wedge-shaped rotating body. The device comprises a carrier, a wedge-shaped rotating body and a pulse power supply, wherein the wedge-shaped rotating body is positioned above the carrier, the pulse power supply is connected to the carrier and the wedge-shaped rotating body through conductors, a test object is fixed on the carrier, the top of the wedge-shaped rotating body is connected to the output end of a driving shaft through a transmission shaft, the driving shaft drives the wedge-shaped rotating body to rotate and can apply downward pressure, and the wedge-shaped rotating body can be pressed against the test object and rotate on the surface of the test object.

7 Claims, 3 Drawing Sheets

ELECTRO-MAGNETO-THERMO-MECHANICAL DYNAMIC AND SYNCHRONOUS LOADING DEVICE BASED ON WEDGE-SHAPED ROTATING BODY

CROSS-REFERENCE TO RELATED APPLICATIONS

This application claims priority to Chinese Application Serial No. 202111389467.6, filed Nov. 22, 2021, the content of which is incorporated herein by reference in its entirety.

TECHNICAL FIELD

The present disclosure relates to the technical field of test equipment, and specifically relates to an electro-magneto-thermo-mechanical dynamic and synchronous loading device based on a wedge-shaped rotating body.

BACKGROUND

In the research and application fields of extreme electromagnetic energy, material science and high-end equipment, the synchronous appearance of electro-magneto-thermo-mechanical multi-field coupling extreme conditions is concerned. In the extreme conditions of electro-magneto-thermo-mechanical coupling, there are enormous challenges to meet the material performance. At present, the existing electro-magneto-thermo-mechanical synchronous loading device can only realize static equivalent loading in some extreme conditions or low-parameter synchronous loading coupled with some conditions, cannot provide a testing environment for examining the damage phenomena of materials in electro-magneto-thermo-mechanical multi-field coupling extreme conditions and researching the material mechanism in the extreme conditions, and cannot solve the problems in electro-magneto-thermo-mechanical multi-field coupling extreme test conditions that the scientific research of extreme electromagnetic energy, material science and high-end equipment in national defense and industry faces.

SUMMARY

The present disclosure aims to provide an electro-magneto-thermo-mechanical dynamic and synchronous loading device based on a wedge-shaped rotating body. The device comprises a carrier, a wedge-shaped rotating body and a pulse power supply, wherein the pulse power supply is connected to the carrier and the wedge-shaped rotating body through conductors, the wedge-shaped rotating body is positioned above the carrier, a test object is fixed on the carrier, the wedge-shaped rotating body is connected to the output end of a driving shaft, the driving shaft applies downward pressure while driving the wedge-shaped rotating body to rotate, and the wedge-shaped rotating body can be pressed against the test object and rotate on the surface of the test object.

As further optimization of the above-mentioned scheme, the carrier, the wedge-shaped rotating body and the test object are all conductors.

As further optimization of the above-mentioned scheme, the top of the wedge-shaped rotating body is connected to the output end of the driving shaft through a transmission shaft.

As further optimization of the above-mentioned scheme, the output end of the driving shaft is sequentially provided with a first coupling, an insulating gasket and a second coupling, the insulating gasket is sandwiched between the first coupling and the second coupling, and the other end of the second coupling is connected to the transmission shaft.

As further optimization of the above-mentioned scheme, a key slot is formed in the transmission shaft, the top of the wedge-shaped rotating body is provided with a connecting shaft, and the other end of the connecting shaft is connected to the transmission shaft.

As further optimization of the above-mentioned scheme, a conducting ring is installed at the joint of the wedge-shaped rotating body and the driving shaft, and the conducting ring is in sleeve connection with the driving shaft through a bearing.

As further optimization of the above-mentioned scheme, one electrode of the pulse power supply is connected to the wedge-shaped rotating body through the conductor and the conducting ring, and the other electrode of the pulse power supply is connected to the carrier through the conductor.

The device has the beneficial effects that electro-magneto-thermo-mechanical synchronous control is realized by regulating and controlling the output parameters of the pulse power supply, the pressure applied by the driving shaft and the rotating speed of the wedge-shaped rotating body, and then synchronous and dynamic loading in electro-magneto-thermo-mechanical multi-field coupling extreme conditions is realized. The device is of great significance to research the damage phenomena and mechanism of materials under extreme electro-magneto-thermo-mechanical conditions.

Firstly, according to the electro-magneto-thermo-mechanical dynamic and synchronous loading device based on a wedge-shaped rotating body, when working, the device can control the loading of required pressure and the rotating speed of the wedge-shaped body while the pulse current flowing through the test object is met. In the rotating process, a large amount of friction heat is generated due to sliding friction in surface contact with the surface of the test object, and combined with a large amount of Joule heat and arc heat generated by the pulse current, the surface temperature of the test object is increased sharply. At the same time, the pulse current generates a great electromagnetic force between the test object and the wedge, and combined with the pressure, friction force and thermal stress applied by the driving shaft, the strain of the test object is increased rapidly, so that synchronous and dynamic loading in electro-magneto-thermo-mechanical multi-field coupling extreme conditions is realized.

Secondly, the sliding friction in surface contact with the surface of the test object is formed by rotating the wedge, and one planar test object is tested, so that the whole measured plane is loaded with the same conditions. Thus, the effective contact area between the test object and the wedge-shaped rotating body is enlarged, equivalently the test area is enlarged, so that the test approaches the actual application environment, and the data is more effective.

BRIEF DESCRIPTION OF THE DRAWINGS

The attached figures serve to provide further understanding of the present disclosure and constitute a part of the specification, together with embodiments of the present disclosure, serve to explain the present disclosure and do not constitute limitation of the present disclosure. In the attached figures.

Reference signs in the attached figures: 1, carrier; 2, wedge-shaped rotating body; 21, connecting shaft; 3, pulse power supply; 31, conductor; 4, test object; 5, driving shaft; 51, first coupling; 52, insulating gasket; 53, second coupling; 54, bearing; 55, conducting ring; 6, transmission shaft; and 61, key slot.

DETAILED DESCRIPTION OF THE EMBODIMENTS

The present disclosure is further described in conjunction with the specific embodiments. The embodiments are merely used for illustrating the present disclosure without limiting the scope of the present disclosure.

Figure 1:
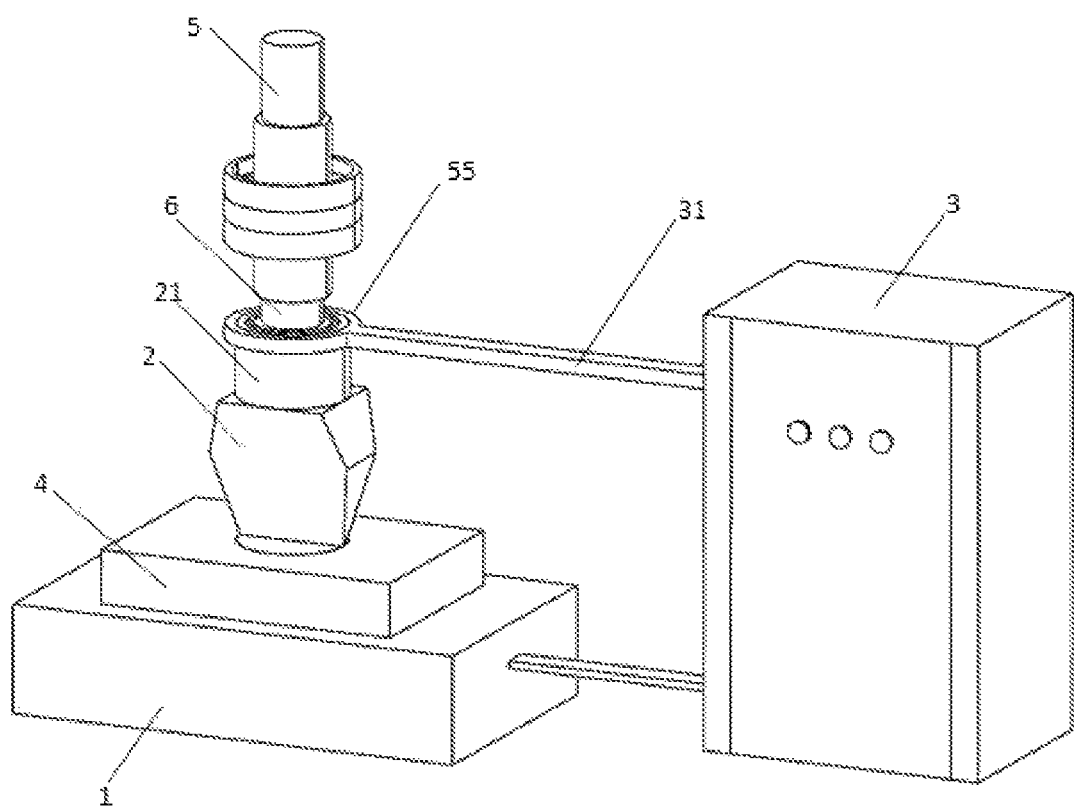
FIG. 1 is a structural schematic diagram of an electro-magneto-thermo-mechanical dynamic and synchronous loading device based on a wedge-shaped rotating body in the embodiment.
Figure 2:
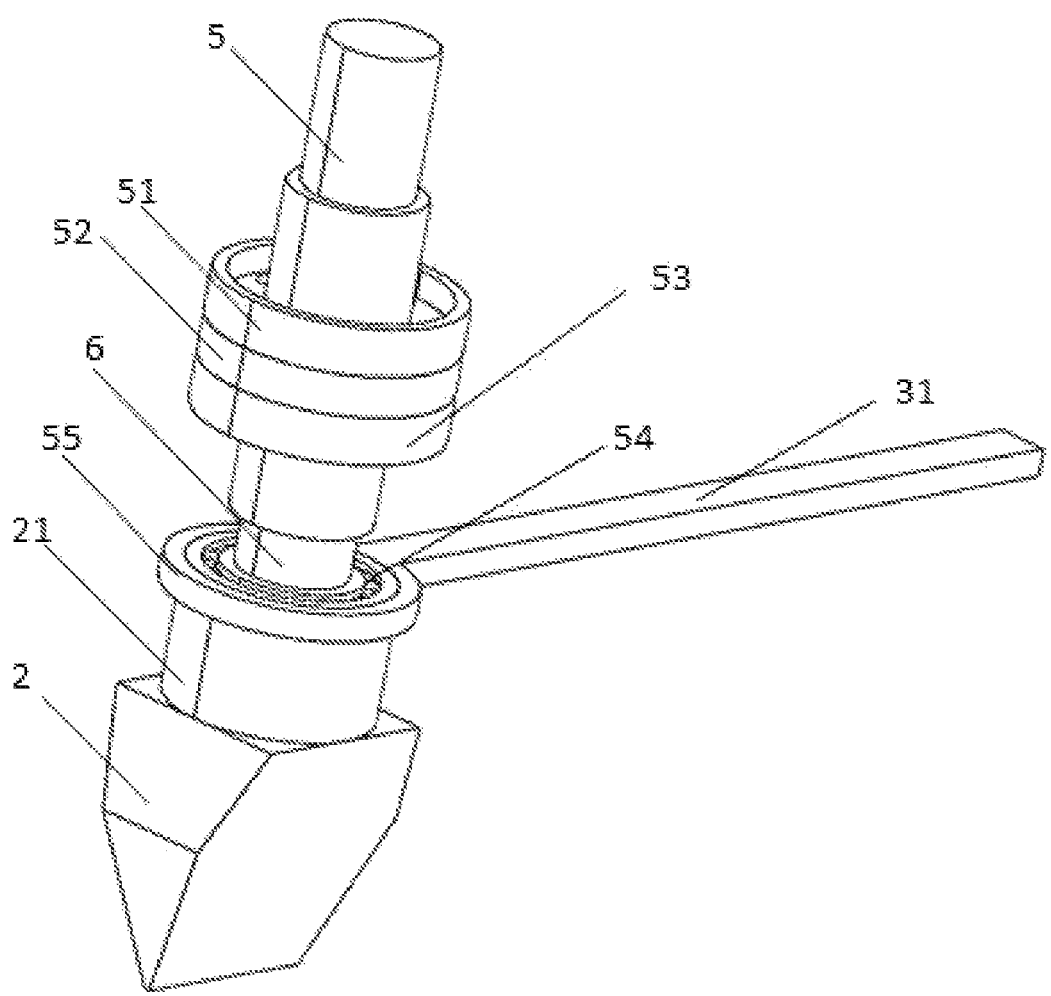
FIG. 2 is a structural schematic diagram of a wedge-shaped rotating body and a driving shaft in the embodiment.

Referring to FIG. 1 and FIG. 2, the embodiment provides an electro-magneto-thermo-mechanical dynamic and synchronous loading device based on a wedge-shaped rotating body. The device comprises a carrier 1, a wedge-shaped rotating body 2 and a pulse power supply 3. The wedge-shaped rotating body 2 is positioned above the carrier 1. The pulse power supply 3 is connected to the carrier 1 and the wedge-shaped rotating body 2 through conductors. The carrier 1 is used for supporting and fixing a test object 4. The test object 4 is fixed on the carrier 1 through bolts or clamps. The top of the wedge-shaped rotating body 2 is connected to the output end of a driving shaft 5 through a transmission shaft 6. The driving shaft 5 is used for driving the wedge-shaped rotating body 2 to rotate and can apply downward pressure. The wedge-shaped rotating body 2 can be pressed against the test object 4 and rotate on the surface of the test object 4 under the action of the driving shaft 5. The pressure on the test object 4 is regulated by the driving shaft 5. The wedge-shaped rotating body 2 rotates and forms a surface contact sliding motion with the test object 4, and sliding friction is generated on the surface of the test object 4. The carrier 1, the wedge-shaped rotating body 2 and the test object 4 are all conductors.

According to the electro-magneto-thermo-mechanical dynamic and synchronous loading device based on a wedge-shaped rotating body in the embodiment, combined with a measuring system, the pulse current, the pulse voltage, and the surface temperature, stress, electromagnetic field and other signals of the test object 4 are measured in real time, and the signals are sampled at a high speed.

According to the electro-magneto-thermo-mechanical dynamic and synchronous loading device based on a wedge-shaped rotating body in the embodiment, the measuring equipment is controlled to send a time sequence control signal to the pulse power supply 3 and the driving shaft 5, so that the required pressure is synchronously loaded by the pressurizing mechanism of the driving shaft 5 while the pulse current flowing through the test object 4 is met. Meanwhile, the wedge-shaped rotating body 2 is controlled to rotate at a high speed by the driving shaft 5. During the high-speed rotating process of the wedge-shaped rotating body 2, sliding friction in surface contact with the test object 4 is formed, resulting in a large amount of friction heat. Combined with a large amount of Joule heat and arc heat generated by the pulse current, the surface temperature of the test object 4 is increased rapidly under the combined action of the friction heat, Joule heat and arc heat. A great electromagnetic force is generated between the test object 4 and the wedge-shaped rotating body 2 due to the high pulse current. Combined with the pressure applied by the driving shaft 5, and the friction force and thermal stress between the wedge-shaped rotating body 2 and the test object 4, the strain of the test object 4 is increased rapidly, so that synchronous and dynamic loading in electro-magneto-thermo-mechanical multi-field coupling extreme conditions is realized. In addition, one planar test object 4 can be tested while the high-speed rotation of the wedge-shaped rotating body 2 is realized, so that the whole measured plane is loaded with the same load. Thus, the effective contact area between the test object 4 and the wedge-shaped rotating body 2 is enlarged, equivalently the test area is enlarged, so that the test approaches the actual application environment, and the data is more effective.

Figure 3:
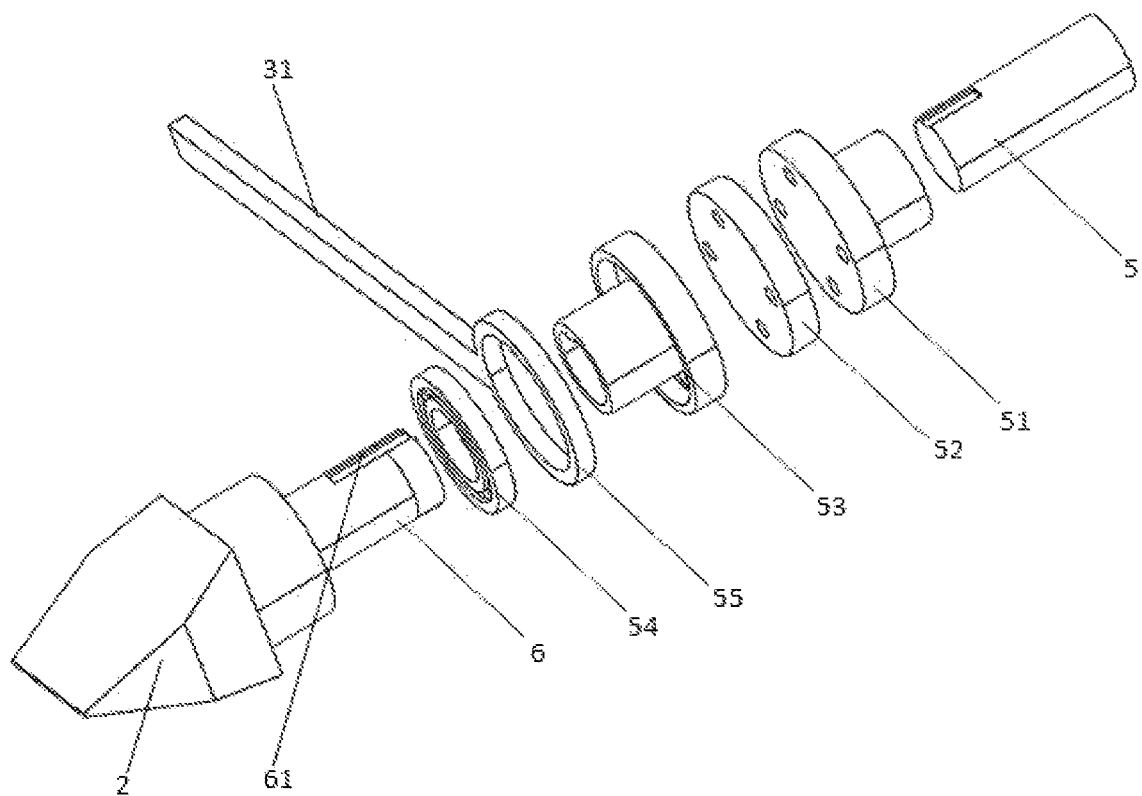
FIG. 3 is an explosive view of a wedge-shaped rotating body and a driving shaft in the embodiment.

Referring to FIG. 1, FIG. 2 and FIG. 3, in the specific connecting structure of the wedge-shaped rotating body 2 and the driving shaft 5, the output end of the driving shaft 5 is sequentially provided with a first coupling 51, an insulating gasket 52 and a second coupling 53, the insulating gasket 52 is sandwiched between the first coupling 51 and the second coupling 53, and the other end of the second coupling 53 is connected to the transmission shaft 6. A key slot 61 is formed in the transmission shaft 6, the top of the wedge-shaped rotating body 2 is provided with a connecting shaft 21, and the other end of the connecting shaft 21 is connected to the transmission shaft 6.

Referring to FIG. 1 and FIG. 2, further, an abrasion-resistant and high-temperature-resistant conducting ring 55 capable of adapting to a high-speed rotating friction environment is installed at the joint of the wedge-shaped rotating body 2 and the driving shaft 5, and the conducting ring 55 is in sleeve connection with the driving shaft 6 through a bearing 54. One electrode of the pulse power supply 3 is reliably connected to the wedge-shaped rotating body 2 through the conductor 31, the conducting ring 55 and the driving shaft 5, and the other electrode of the pulse power supply is reliably connected to the carrier 1 through the conductor 31. The conductor 31 can withstand the electric force brought by the pulse current and the heat generated by the pulse current without being damaged.

Referring to FIG. 1 and FIG. 2, further, the specific structure of the wedge-shaped rotating body 2 comprises a front side wall and a rear side wall which are gradually inclined and close to each other from top to bottom. The front side wall and the rear side wall are in line contact with the bottom surface of the wedge-shaped rotating body in a contracted manner. When the wedge-shaped rotating body rotates at a high speed, sliding friction in circular surface contact with the test object is formed.

Further, in the embodiment, the power of the driving mechanism of the driving shaft 5 meets light-load starting under the pressure conditions, and the time for the driving shaft 5 to reach the required rotating speed is not more than a specified value (usually in millisecond level). The performance of the pressurizing mechanism of the driving shaft 5 meets the pressure stability and accuracy under the condition of the wedge-shaped rotating body 2 high-speed rotation driven by the driving shaft 5.

The embodiment further provides a test method of the electro-magneto-thermo-mechanical dynamic and synchronous loading device based on a wedge-shaped rotating body. The test method comprises the following steps: while the pulse power supply 3 meets the pulse current flowing through the test object 4, loading the required pressure and driving the wedge-shaped rotating body 2 to rotate at a high speed by the driving shaft 5, measuring the pulse current, the pulse voltage, and the surface temperature, stress, electro-magnetic field and other signals of the test object 4 in real time, and regulating and controlling the output pulse current by the pulse power supply 3, the applied pressure of the driving shaft 5 and the rotating speed of the wedge-shaped rotating body 2 to realize synchronous and dynamic loading in electro-magneto-thermo-mechanical multi-field coupling extreme conditions.

Although the present disclosure has been described in detail with reference to the foregoing embodiments, for those skilled in the art, modifications may still be made to the subject matter recited in the foregoing embodiments, or equivalents may be substituted for some of the technical features thereof. Any modification, equivalent replacement, or improvement made without departing from the spirit and principle of the present disclosure shall fall within the protection scope of the present disclosure.

What is claimed is:

1. An electro-magneto-thermo-mechanical dynamic and synchronous loading device based on a wedge-shaped rotating body, comprising:
    a carrier,
    a wedge-shaped rotating body and
    a pulse power supply, wherein the pulse power supply is connected to the carrier and the wedge-shaped rotating body through conductors,
    the wedge-shaped rotating body is positioned above the carrier,
    a test object is fixed on the carrier,
    the wedge-shaped rotating body is connected to an output end of a driving shaft, the driving shaft applies downward pressure while driving the wedge-shaped rotating body to rotate, and
    the wedge-shaped rotating body can be pressed against the test object and rotate on the surface of the test object.

2. The electro-magneto-thermo-mechanical dynamic and synchronous loading device based on a wedge-shaped rotating body according to claim 1, wherein the carrier, the wedge-shaped rotating body and the test object are all conductors.

3. The electro-magneto-thermo-mechanical dynamic and synchronous loading device based on a wedge-shaped rotating body according to claim 1, wherein a top of the wedge-shaped rotating body is connected with the output end of the driving shaft through a transmission shaft.

4. The electro-magneto-thermo-mechanical dynamic and synchronous loading device based on a wedge-shaped rotating body according to claim 3, wherein the output end of the driving shaft is sequentially provided with a first coupling, an insulating gasket and a second coupling, the insulating gasket is sandwiched between the first coupling and the second coupling, and an other end of the second coupling is connected to the transmission shaft.

5. The electro-magneto-thermo-mechanical dynamic and synchronous loading device based on a wedge-shaped rotating body according to claim 3, wherein a key slot is provided with a connecting shaft, and an other end of the connecting shaft is connected to the transmission shaft.

6. The electro-magneto-thermo-mechanical dynamic and synchronous loading device based on a wedge-shaped rotating body according to claim 3, wherein a conducting ring is installed at a joint of the wedge-shaped rotating body and the driving shaft, and the conducting ring is in sleeve connection with the driving shaft through a bearing.

7. The electro-magneto-thermo-mechanical dynamic and synchronous loading device based on a wedge-shaped rotating body according to claim 6, wherein one electrode of the pulse power supply (3) is connected to the wedge-shaped rotating body (2) through the conductors (31) and the conducting ring (55), and the other electrode of the pulse power supply (3) is connected to the carrier (1) through the conductors (31).

* * * * *